(12) United States Patent
Masanek, Jr.

(10) Patent No.: US 9,145,035 B2
(45) Date of Patent: Sep. 29, 2015

(54) COLLAPSIBLE STEP PLATFORM AND RECEIVER POST

(71) Applicant: MacNeil IP LLC, Bolingbrook, IL (US)

(72) Inventor: Frederick W. Masanek, Jr., Barrington, IL (US)

( * ) Notice: Subject to any disclaimer, the term of this patent is extended or adjusted under 35 U.S.C. 154(b) by 62 days.

(21) Appl. No.: 13/953,121

(22) Filed: Jul. 29, 2013

(65) Prior Publication Data

US 2015/0028573 A1 Jan. 29, 2015

(51) Int. Cl.
*B60D 1/60* (2006.01)
*B60D 1/58* (2006.01)
*B60D 1/24* (2006.01)
*B60R 3/00* (2006.01)

(52) U.S. Cl.
CPC *B60D 1/58* (2013.01); *B60D 1/243* (2013.01); *B60D 1/244* (2013.01); *B60R 3/00* (2013.01)

(58) Field of Classification Search
CPC .......... B60D 1/243; B60D 1/244; B60D 1/60; B60D 1/605
See application file for complete search history.

(56) References Cited

U.S. PATENT DOCUMENTS

| | | | |
|---|---|---|---|
| 382,331 A | 5/1888 | Stanwood | |
| 810,199 A | 1/1906 | Erret | |
| 3,580,613 A | 5/1971 | Northrop | |
| 3,608,943 A | 9/1971 | Gostomski | |
| 3,627,350 A | 12/1971 | Cross | |
| 3,717,362 A | 2/1973 | Johnson | |
| 3,756,622 A | 9/1973 | Pyle et al. | |
| 3,762,742 A | 10/1973 | Bucklen | |
| 3,967,695 A | 7/1976 | Waddell | |
| 3,976,164 A | 8/1976 | Miller | |
| 3,980,319 A | 9/1976 | Kirkpatrick | |
| 3,992,047 A | 11/1976 | Barenyi et al. | |
| 4,017,093 A | 4/1977 | Stecker, Sr. | |
| 4,231,583 A | 11/1980 | Learn | |
| D296,431 S | 6/1988 | Yont | |
| 4,889,374 A | 12/1989 | Choun | |
| 4,893,856 A | 1/1990 | Council | |
| 4,947,961 A | 8/1990 | Dudley | |
| D315,134 S | 3/1991 | Springer | |
| 5,358,269 A | 10/1994 | Jakeman et al. | |
| 5,366,264 A | 11/1994 | Guay | |
| 5,478,124 A | 12/1995 | Warrington et al. | |
| D370,452 S | 6/1996 | Beasley | |
| 5,620,218 A | 4/1997 | Saltzman et al. | |
| 5,647,621 A * | 7/1997 | McClellan | 293/117 |
| 5,738,362 A | 4/1998 | Ludwick | |
| 5,829,774 A | 11/1998 | Klemp | |
| 5,979,094 A | 11/1999 | Brafford, Jr. | |
| 6,007,033 A | 12/1999 | Casson et al. | |
| 6,053,627 A | 4/2000 | Vo et al. | |
| 6,140,919 A | 10/2000 | Buchanan | |
| 6,145,861 A | 11/2000 | Willis | |
| 6,170,843 B1 | 1/2001 | Maxwell et al. | |
| 6,173,979 B1 | 1/2001 | Bernard | |
| D440,931 S | 4/2001 | Knight, III et al. | |
| 6,247,257 B1 * | 6/2001 | Powell | 40/591 |
| 6,357,899 B1 | 3/2002 | Craven | |
| 6,491,315 B2 | 12/2002 | Hagen et al. | |
| 6,511,086 B2 * | 1/2003 | Schlicht | 280/166 |

(Continued)

*Primary Examiner* — Katy M Ebner
(74) *Attorney, Agent, or Firm* — Perkins IP Law Group LLC; Jefferson Perkins

(57) ABSTRACT

A collapsible step platform and receiver post are adapted to be attached to a vehicle hitch receiver. Oblique cross members of the step body provide additional protection in the event of a rear-end collision.

4 Claims, 2 Drawing Sheets

(56) References Cited

U.S. PATENT DOCUMENTS

| | | |
|---|---|---|
| 6,659,519 B2 | 12/2003 | Turner |
| 6,682,086 B1 | 1/2004 | Erickson |
| D491,509 S | 6/2004 | Bundy |
| 6,769,704 B2 | 8/2004 | Cipolla |
| 6,820,924 B2 * | 11/2004 | Caliskan et al. ......... 296/187.03 |
| 6,896,303 B1 * | 5/2005 | Mohr ........................... 293/117 |
| D511,319 S | 11/2005 | Wang |
| D513,217 S | 12/2005 | Daws et al. |
| D527,323 S | 8/2006 | Storer |
| D549,623 S | 8/2007 | Gaddy |
| 7,377,564 B1 | 5/2008 | Baffy et al. |
| D582,826 S | 12/2008 | Burchett et al. |
| 7,527,327 B2 * | 5/2009 | Aghssa et al. ........... 296/203.04 |
| D595,630 S | 7/2009 | McPherson et al. |
| 7,661,693 B1 | 2/2010 | Lipski |
| 7,766,357 B2 | 8/2010 | Arvanites |
| 7,775,536 B2 | 8/2010 | Shumway |
| D634,687 S | 3/2011 | Vukel |
| 7,954,836 B2 | 6/2011 | Mann |
| 7,967,311 B2 | 6/2011 | Phillips |
| D645,805 S | 9/2011 | Vukel |
| D652,775 S | 1/2012 | Spera |
| 8,465,043 B1 * | 6/2013 | Buckert et al. ................. 280/507 |
| 2003/0116938 A1 | 6/2003 | Shields et al. |
| 2004/0017061 A1 * | 1/2004 | Roberts ........................ 280/507 |
| 2007/0262564 A1 * | 11/2007 | Kahl ............................ 280/506 |
| 2008/0011797 A1 | 1/2008 | Newbill |
| 2008/0018074 A1 | 1/2008 | Steffens et al. |
| 2009/0230656 A1 * | 9/2009 | Blakley ........................ 280/504 |
| 2010/0294819 A1 | 11/2010 | Spera |
| 2011/0285104 A1 | 11/2011 | Wotherspoon |
| 2012/0248801 A1 * | 10/2012 | Wu ................................ 293/142 |
| 2013/0270791 A1 | 10/2013 | Anderson |
| 2014/0001781 A1 * | 1/2014 | Leking ......................... 293/135 |

* cited by examiner

COLLAPSIBLE STEP PLATFORM AND RECEIVER POST

BACKGROUND OF THE INVENTION

Pickup trucks and sport utility vehicles (SUV's) [mini vans?] often have receiver-type hitches that mount to the frame of the vehicle. The receiver-type hitch has a rearward-facing opening that accepts ball mounts, bike racks, cargo carriers and other hitch mounted accessories. One accessory often attached to the hitch is a platform or step attachment. By providing a raised platform, the platform or step attachment makes the bed of the truck or SUV more accessible to the user. However, because the platform or step attachment extends rearwardly past the bumper, it will be the point of first impact for any rear end collisions.

Thus a need exists for a platform or step attachment for a receiver-type hitch that absorbs force from the impact of a rear end collision.

SUMMARY OF THE INVENTION

According to one aspect of the invention, a collapsible step platform is adapted to be attached to a vehicle hitch receiver. The step platform comprises a step body with a rear panel disposed substantially at a right angle to the longitudinal axis. The rear panel has an exterior side, an interior side, and a top and bottom edge. At least one transverse member is disposed forwardly of the rear panel and substantially at a right angle to the longitudinal axis. More than one oblique cross member extends from the interior side of the rear panel to a rear surface of the transverse member. Each of the oblique cross members is disposed at an angle which is between zero and ninety degrees exclusive from the longitudinal axis. The oblique cross members are adapted to collapse in a forward direction when the force of an impact is applied to the exterior of the rear panel.

According to another aspect of the invention a receiver post is adapted to be inserted into a hitch receiver. The receiver post has a receiver post body disposed around a longitudinal axis. The receiver post body has a top panel and a bottom panel spaced from and opposed to the top panel. A center panel extends from the bottom panel to the top panel and is substantially at a right angle to the top and bottom panels. More than one cylinder is disposed in the receiver post body and they are at an angle to the axis. Each of the cylinders extends through the center panel and has a support structure. The cylinder support structures each have a top vertical member in parallel with the cylinder and extending from the cylinder to the top panel and a bottom vertical member in parallel with the cylinder and extending from the cylinder to the bottom panel. The support structures are adapted to collapse upon impact, thereby absorbing the force from the impact.

The present invention provides an advantage to traditional hitch attachments in that the collapsible step platform and/or receiver post absorb at least some of the impact of rear end collisions.

BRIEF DESCRIPTION OF THE DRAWINGS

Further aspects of the invention and their advantages can be discerned in the following detailed description, in which like characters denote like parts and in which.

DETAILED DESCRIPTION

The present invention provides a collapsible step platform for insertion into a receiver type hitch on a vehicle. In the embodiment shown in FIG. 1, a step platform indicated generally at 100 includes a step body 102 and a receiver post 104. The receiver post 104 is sized to fit inside a standard receiver-type hitch. The step platform is preferably formed from plastic as by injection molding but may also be formed from aluminum billet.

Figure 1:
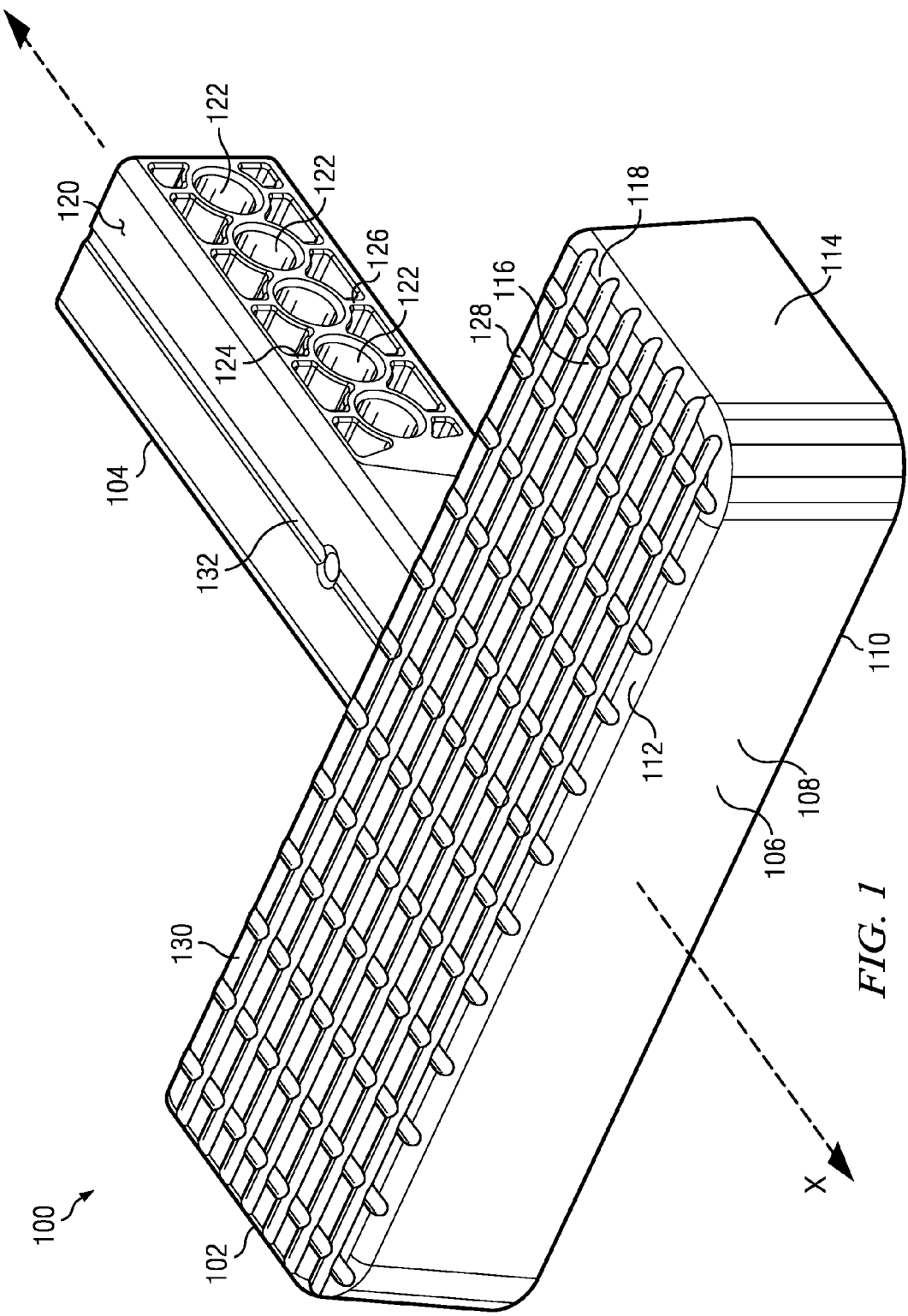
FIG. 1 is an isometric view of a collapsible step platform and receiver post according to the invention.

As shown in FIG. 1, the step body 102 has a rear panel 106 with an exterior surface 108. The rear panel 106 is substantially perpendicular or at right angles to a longitudinal axis x. Rear panel 106 may be straight or may have a slightly convex curve such as a curve with a 400 inch radius. The rear panel 106 also has a bottom edge 110 and a top edge 112. The step body 102 may have a right exterior side panel 114 which is substantially in parallel with the longitudinal axis and which joins the rear panel 106.

The top of the step body may have a top panel 116 which may be joined to the rear panel 106 and the right exterior side panel 114. The top panel 116 may have an exterior side 118. A series of longitudinal indentations 128 and lateral indentations 130 may be formed on the exterior side 118 of the top panel 116. The longitudinal and lateral indentations 128, 130 provide traction to the user when using the step, however, the number and placement of the indentations can vary. Additionally, the step body may be attached to a receiver post 104 which will be discussed in further detail below.

Figure 2:
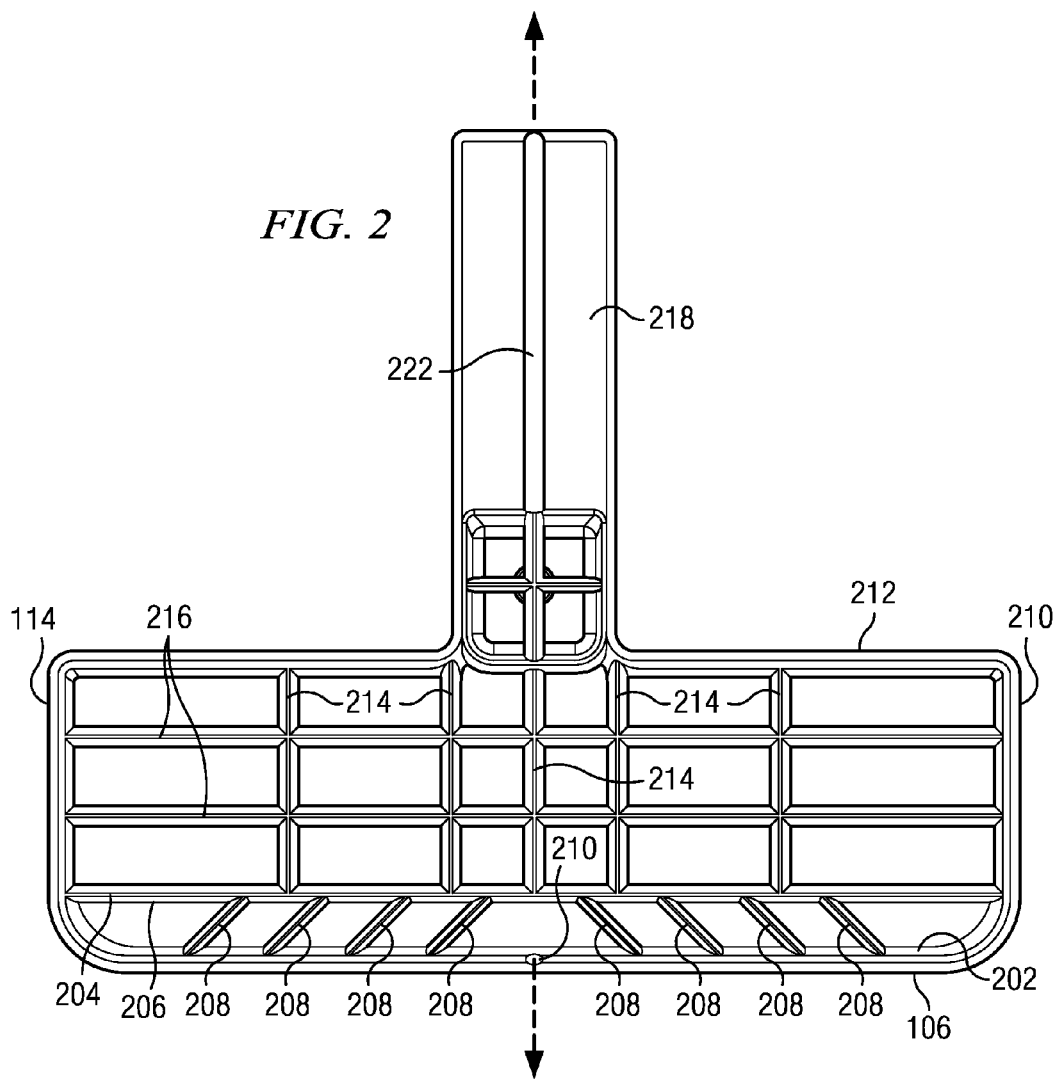
FIG. 2 is a side view of the collapsible step platform and receiver post.

As seen on the embodiment illustrated in FIG. 2, the rear panel 106 has an interior side 202 and may join a left exterior side panel 210. The left exterior side panel 210 is substantially in parallel with the longitudinal axis x and is transversely spaced from the right exterior side panel 114. The left exterior side panel 210 may join the top panel 116. At least one transverse member 204 is disposed forwardly of the rear panel 106 and at a right angle to the longitudinal axis x. The transverse member 204 may take the form of a plate or panel has a rear surface 206. Member 204 may extend between and be joined to the right side panel 114, the left side panel 210, and the top panel 116.

Some embodiments may include additional transverse members 216 such as the two additional transverse members 216 shown in FIG. 2. The additional transverse members 216 are disposed substantially at right angles to the longitudinal axis x and are forwardly spaced from the first transverse member 204 and spaced from each other. The additional transverse members 216 extend between the right side panel 114 and the left side panel 210. Longitudinally aligned support members 214 may be panels or plates, and may extend from the transverse members to the forward panel 212. The longitudinally aligned support members 214 are spaced from each other and are at substantially right angles to the transverse members 204, 216, however the number of additional transverse members 216 and spacing of the additional transverse members 216 may vary from what is shown in the illustrated embodiment of FIG. 2.

More than one oblique cross member 208 extends from the interior side 202 of the rear panel 106 to the rear surface 206 of the transverse member 204. In the illustrated embodiment eight oblique cross members 208 are shown, but the number may include more or less. Each of the oblique cross members 208 is disposed at an angle between zero and ninety degrees exclusive from the longitudinal axis x; in the illustrated embodiment the angle is approximately forty-five degrees. Additionally, in the illustrated embodiment half of the oblique cross members 208 are on either side of the midpoint 220 of the rear panel 106. The oblique cross members 208 are adapted to collapse in a forward direction upon impact being applied to the exterior surface 108 of the rear panel 106. Therefore, in the event of a rear end collision, the collapsing oblique cross members 208 will absorb at least some of the force of the impact. Cross members 208 may have a thickness which is several times less than their length and may take the form of panels or plates, as shown.

Figure 3:
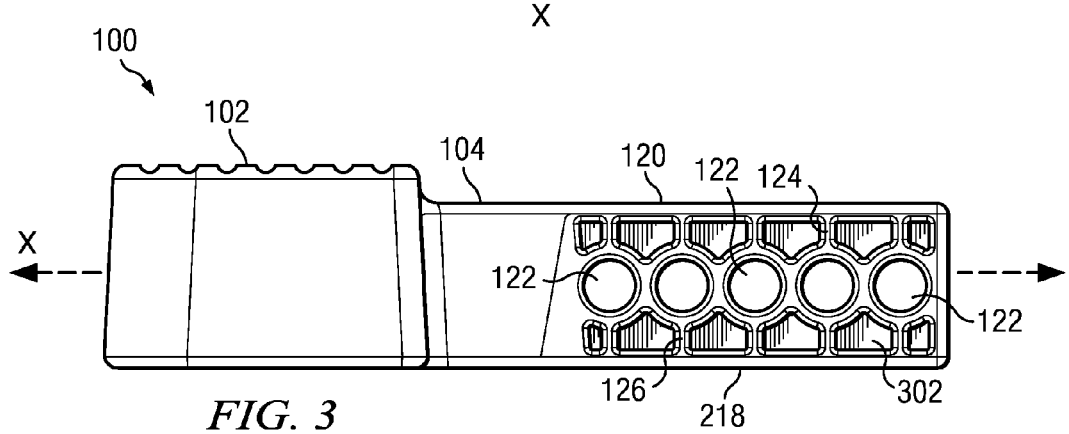
FIG. 3 is a plan view of the bottom of the collapsible step platform and receiver post.

As shown in FIG. 1, the collapsible step platform 100 may include a receiver post 104. The receiver post body 104 is disposed around longitudinal axis x, and has a top panel 120 and a bottom panel 218 (See FIG. 2) opposed to and spaced from the top panel 120. The top panel 120 and the bottom panel 218 are substantially parallel with the axis x. In addition a center panel 302 (See FIG. 3) may be vertical and is also parallel to the axis x. The center panel 302 may be lined up along the receiver post top panel indentation 132 and receiver post bottom panel indentation 222 (See FIG. 2).

A plurality of cylinders 122 are disposed in the receiver post body 104 at an angle to the axis x, such as 90 degrees. One of the cylinders 122 will receive a pin from the receiver-type hitch, thereby attaching the receiver post 104 (and in this case the collapsible step platform 102) to the hitch. Accordingly, the number and placement of cylinders 122 may vary due to the type of receiver-type hitch being used and application. Each of the cylinders 122 extends through the center panel 302 (see FIG. 3) which may be aligned on the longitudinal indentation 128 shown on FIGS. 1 and 2. Each cylinder 122 has a support structure which includes a top vertical member 124 in parallel with the cylinder 122 and extending from the cylinder 122 to the top panel 120 and a bottom vertical member 126 in parallel with the cylinder 122 and extending from the cylinder 122 to the bottom vertical member 218. Vertical members 124, 126 may have thicknesses which are many times smaller than their lengths and may be plates or panels, as shown. Support structures 124, 126 support cylinders 122 but provide no resistance to a rear axially applied impact force; all of the impact force has to be absorbed by cylinders 122, top panel 120, bottom panel 218 and central panel 302. A step body 102 may be integrally formed with and extend rearwardly from the receiver post.

In summary, a collapsible step platform and receiver post have been shown and described which absorb force from a rear-end collision. While illustrated embodiments of the present invention have been described and illustrated in the appended drawings, the present invention is not limited thereto but only by the scope and spirit of the appended claims.

I claim:

1. A receiver post to be inserted into a hitch receiver, the receiver post comprising:
   a receiver post body having a top panel, the receiver post body disposed around a longitudinal axis, a bottom panel spaced from and opposed to the top panel, the top panel and the bottom panel being substantially parallel with the axis, a center panel extending from the bottom panel to the top panel and substantially at a right angle to the top and bottom panels;
   a plurality of cylinders disposed in the receiver post body to be at an angle to the axis, each of the plurality of cylinders extending through the center panel, a respective support structure provided for each of the plurality of cylinders, each of said support structures including a top vertical member in parallel with the cylinder and extending from the cylinder to the top panel and a bottom vertical member in parallel with the cylinder and extending from the cylinder to the bottom panel, each of said support structures being spaced apart from adjacent support structures, the support structures adapted, upon impact being applied to the receiver post, to collapse, thereby absorbing the force from the impact.

2. The receiver post of claim 1, wherein the top and bottom vertical members are plates which are substantially perpendicular to the longitudinal axis and the center panel.

3. The receiver post of claim 1, further including a step body integrally formed with and extending rearwardly from the receiver post.

4. The receiver post of claim 1, wherein the receiver post is integrally molded of a polymeric material.

* * * * *